L. J. WALSHE.
LICENSE NUMBER PLATE AND TAIL LIGHT.
APPLICATION FILED MAR. 17, 1920.
1,381,038.
Patented June 7, 1921.
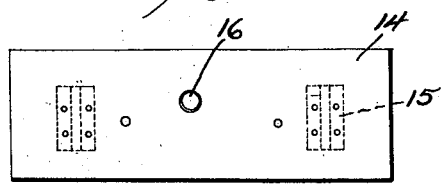
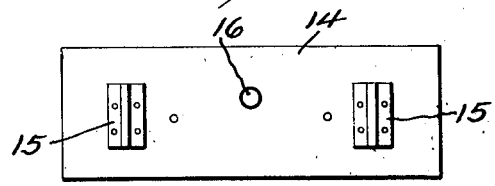
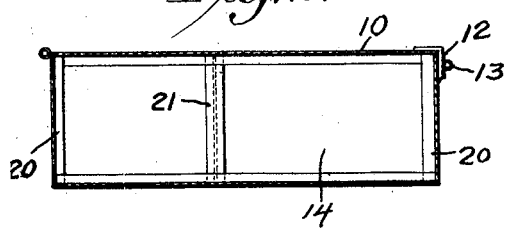
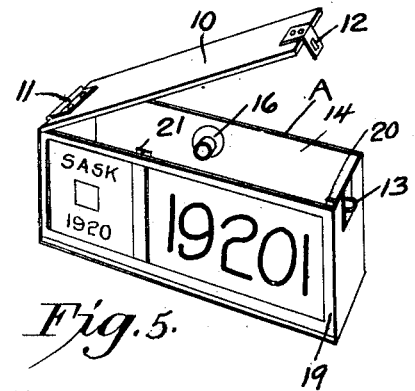
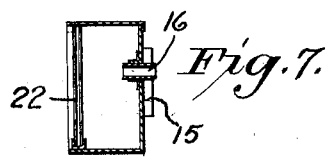
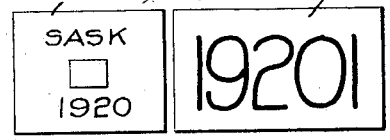
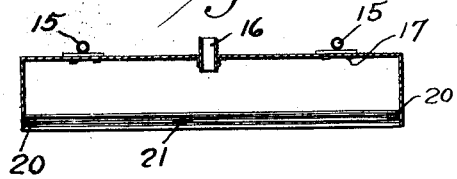
Inventor:
Laurence Joseph Walshe

UNITED STATES PATENT OFFICE.

LAURENCE JOSEPH WALSHE, OF SASKATOON, SASKATCHEWAN, CANADA.

LICENSE-NUMBER PLATE AND TAIL-LIGHT.

1,381,038.   Specification of Letters Patent.   Patented June 7, 1921.

Application filed March 17, 1920. Serial No. 366,584.

*To all whom it may concern:*

Be it known that I, LAURENCE JOSEPH WALSHE, of 615 Fifth avenue north, in the city of Saskatoon, in the Province of Saskatchewan, Canada, city paymaster, and a citizen of Canada, having invented certain new and useful Improvements in License-Number Plates and Tail-Lights, do hereby declare that the following is a full, clear, and exact description of the same.

This invention relates to improvements in illuminated visible license number plate and tail light, for automobiles, automobile trucks or motor cycles, and the objects of the invention are to render the license number readily visible both at day and night time, to provide means whereby the case can be readily positioned either at the front or the back of the automobile, to permit of the license number plate and the plate showing the province, county or town together with the crest thereof and the plate carrying the year for which the license has been granted or renewed being readily removable so that they can be replaced by new ones or can be corrected to suit any changes which may be made thereon, to provide a lamp for the interior of the case, which lamp may either be white or red depending on whether the case is to be located at the front or rear of an automobile or like vehicle, and generally to adapt the several parts to better perform the functions required of them.

With the above and other objects in view, the invention consists essentially of the improved construction and arrangement of parts particularly described and set forth in the following specification and accompanying drawings forming part of the same.

In the drawings:

Figure 1 is an elevation of the back wall taken from the inside case embodying my invention.

Fig. 2 is a side elevation of a case embodying my invention, the removable plate having been removed.

Fig. 3 is a sectional plan view of the same.

Fig. 4 is a front elevation of the removable number and like plates designed to be mounted in the casing.

Fig. 5 is a perspective view of the case embodying my invention.

Fig. 6 is a back elevation of the same.

Fig. 7 is a cross section of the same.

Like characters of reference refer to like parts in the several figures.

Referring to the drawings; A represents a case provided with a cover 10, which is connected to the body portion by a hinge 11, and the opposite end of the cover carries a hasp 12 which coacts with the staple 13 secured to one end of the said case.

On the back wall 14 of the case brackets 15 are provided which will slidably engage with supporting fingers so that the case may be mounted on the front or rear of an automobile or like vehicle, and a lamp socket 16 is mounted on the back wall and is connected with a suitable source of power on the automobile or vehicle.

The brackets 15 are fastened to the back wall of the casing by means of bolts and nuts 17.

In this lamp socket 16 a bulb is mounted, the said bulb being either white or red depending on whether the case is to be mounted at the front or rear of the automobile.

The front wall 19 of the casing is of skeleton design and provided at the ends with slotted or recessed guides 20 and intermediate of its length with a double slotted or recessed guide 21, and these guides lie in the same plane.

The front wall 19 thus forms a pair of rectangular frames, which receive the number plate 22 in the larger frame and the year, province, county or town plate 23 in the other frame.

The number plate 22 will be formed of metal having the numbers cut therein in the same manner as a stencil and having a sheet of transparent material provided in the back so that the numbers will be readily visible in daytime against a dark background, or at night time through a light being used in the casing which will throw the numbers into relief and illuminate the same. The plates may also be formed of metal having the numbers marked thereon in paint, which will be readily visible in day time against a dark background, and the numbers may be perforated so that when a light is used in the case the numbers will be readily visible at night time.

Again the number plate 22 may be formed of transparent material, having a backing of black paint or like substance, while the number portion of the plate will be in white, and thus the white number against the black background will be readily visible in day time, and when the bulb in the socket 16 is illuminated the number will also be visible at night time.

The year and province, county or town plate 23 will be made of metal having the letters stenciled out and will be equipped with a sheet of transparent material having a background of black with the year in a different color which will allow the rays of light from the interior of the casing to pass through and illuminate the number at night time, and the province, county or town and crest will also stand out on a suitable background of the desired color. It is of course to be understood that the plate 23 can be made in any of the several styles described for plate 22 which need not be repeated here.

Numbers of automobiles, motorcycles, etc., sometimes vary from year to year and if a new number is allotted, then the plate 22 is slid upwardly from the guides 20 and 21 and the new plate placed between the said guides. The year, province, county or town plate 23 will be changed each year. Should the plates be used it will be obvious that the number and year can be removed therefrom and replaced by a new number and year, so that the plates can be used and re-used as often as is necessary after the desired corrections have been made.

When an automobile, motorcycle or like vehicle is equipped with a device of this nature, and the said device is located in front, then a white light is used and the number or other information about the automobiles, or vehicle is readily discernible either during the day or at night time to all traffic officers, pedestrians and other traffic.

When the device is located at the rear of the automobile and a red light is used in the case, then the number and other information of the car will be illuminated in red and besides giving the desired information will act as a danger signal.

The device is of an extremely simple nature and could be advantageously utilized in motor practice and on automobiles and other vehicles at present in use.

As many changes could be made in the above construction and many widely different embodiments of my invention within the scope of the claim constructed without departing from the spirit or scope thereof, it is intended that all matter contained in the accompanying specification and drawings shall be interpreted as illustrative and not in a limiting sense.

What I claim as my invention is:

A device of the class described comprising a rectangular casing having brackets on the back wall, a cover hinged to the case, the front wall of the case being formed in skeleton formation, end guides on the front wall, the said guides being in the same plane, a removable number plate engaging with the guide, a removable year, province, county or town plate engaging with the guide, the plates being formed with the numbers or letters cut therein by stencil, a sheet of transparent material provided in the back of the plates, and illuminating means in the case.

LAURENCE JOSEPH WALSHE.